United States Patent
Van Wynsberghe

(10) Patent No.: US 10,404,353 B2
(45) Date of Patent: Sep. 3, 2019

(54) GEOSTATIONARY HIGH ALTITUDE PLATFORM

(71) Applicant: Erinn Van Wynsberghe, Hamilton (CA)

(72) Inventor: Erinn Van Wynsberghe, Hamilton (CA)

(*) Notice: Subject to any disclaimer, the term of this patent is extended or adjusted under 35 U.S.C. 154(b) by 0 days.

(21) Appl. No.: 15/766,953

(22) PCT Filed: Oct. 7, 2016

(86) PCT No.: PCT/CA2016/051174
§ 371 (c)(1),
(2) Date: Apr. 9, 2018

(87) PCT Pub. No.: WO2017/059545
PCT Pub. Date: Apr. 13, 2017

(65) Prior Publication Data
US 2018/0294870 A1    Oct. 11, 2018

Related U.S. Application Data

(60) Provisional application No. 62/239,425, filed on Oct. 9, 2015.

(51) Int. Cl.
*H04B 7/185* (2006.01)
*B64B 1/44* (2006.01)
(Continued)

(52) U.S. Cl.
CPC ........... *H04B 7/18504* (2013.01); *B64B 1/44* (2013.01); *B64D 47/00* (2013.01); *B64G 1/40* (2013.01);
(Continued)

(58) Field of Classification Search
CPC .. B64B 1/44; B64D 47/00; B64G 1/40; B64G 1/42; H02J 50/23; H02J 50/27; H04B 7/18504
(Continued)

(56) References Cited

U.S. PATENT DOCUMENTS

| | | | | |
|---|---|---|---|---|
| 4,995,572 A | * | 2/1991 | Piasecki | B64B 1/50 244/140 |
| 5,890,676 A | * | 4/1999 | Coleman | B64B 1/58 244/128 |

(Continued)

FOREIGN PATENT DOCUMENTS

WO        9733790 A1    9/1997

OTHER PUBLICATIONS

International Search Report and Written Opinion from International Application No. PCT/CA2016/051174 dated Nov. 24, 2016.
(Continued)

*Primary Examiner* — Nathan S Taylor
(74) *Attorney, Agent, or Firm* — Lando & Anastasi, LLP

(57) ABSTRACT

A geostationary platform is held afloat by a superpressure balloon. A suitable altitude is 25 km. The craft carries electrohydrodynamic thrusters, to overcome winds, held within a scaffold. Sensors determine position, velocity, acceleration and vector. A CPU performs instructions for station-keeping or navigation. A communication system is included to, inter alia, receive instructions from the ground. The craft carries a payload for observation and transmission, cradled in a temperature-controlled chamber. Power to the platform is transmitted in the form of electromagnetic waves (with suitable frequencies including microwaves of 2.45 GHz or 5.8 GHz) from a ground-based transmitter to a receiving antenna on, or affixed to, the balloon which converts the electromagnetic energy to direct current. A
(Continued)

step-up voltage converter increases the voltage as required. A ground station monitors craft position and operational efficiency by radar to help ensure safe takeoff, operation, and landing of the craft.

7 Claims, 6 Drawing Sheets

(51) Int. Cl.
| | |
|---|---|
| *B64D 47/00* | (2006.01) |
| *B64G 1/40* | (2006.01) |
| *B64G 1/42* | (2006.01) |
| *H02J 50/27* | (2016.01) |
| *H02J 50/23* | (2016.01) |

(52) U.S. Cl.
CPC ............. *B64G 1/42* (2013.01); *H02J 50/23* (2016.02); *H02J 50/27* (2016.02)

(58) Field of Classification Search
USPC .............. 455/12.1, 13.1, 422.1, 431, 445
See application file for complete search history.

(56) References Cited

U.S. PATENT DOCUMENTS

| | | | |
|---|---|---|---|
| 6,119,979 | A | 9/2000 | Lee et al. |
| 6,382,557 | B1 | 5/2002 | Lafuma et al. |
| 6,919,847 | B2 | 7/2005 | Caplan et al. |
| 8,116,763 | B1 * | 2/2012 | Olsen ................... H04W 16/28 455/422.1 |
| 9,327,816 | B1 * | 5/2016 | Mathe ................... G05D 1/042 |
| 9,540,091 | B1 * | 1/2017 | MacCallum ............. B64B 1/44 |
| 2003/0040273 | A1 * | 2/2003 | Seligsohn ................ B64B 1/44 455/12.1 |
| 2003/0236070 | A1 * | 12/2003 | Seligsohn .......... H04B 7/18502 455/12.1 |
| 2008/0265087 | A1 | 10/2008 | Quinn et al. |
| 2012/0120542 | A1 * | 5/2012 | Zhang ................ H05K 7/20172 361/230 |
| 2012/0304618 | A1 * | 12/2012 | Roy ..................... F03H 1/0037 60/203.1 |
| 2016/0040658 | A1 * | 2/2016 | Krauss ................. F03H 1/0037 60/202 |
| 2017/0331177 | A1 * | 11/2017 | MacCallum ............. B64B 1/48 |

OTHER PUBLICATIONS

Masuyama, Kento et al. On the Performance of Electrohydrodynamic Propulsion. Apr. 3, 2013 (Apr. 3, 2013). Proc R Soc A 469: 20120623.

Ilit, Tomas et al. On the Thrust of a Single Electrode Thruster. Mar. 2015. Journal of Electrical Engineering, vol. 66, No. 2: 117-120.

Binns, W.R. The super-tiger instrument: Measurement of elemental abundances of ultra-heavy galactic cosmic rays, The Astrophysical Journal 788 (2014) 18.

Brown, W. C. Rectenna technology program: Ultra light 2.45 GHz rectenna 20 GHz rectenna, Tech. Rep. NASA STI/Recon Technical Report N (Mar. 1987).

"Gilmore, C. K. & Barrett, S. R. Electrohydro-dynamic thrust density using positive coronainduced ionic winds for in-atmosphere propulsion, in: Proc. R. Soc. A, vol. 471, The Royal Society, 2015, p. 20140912."

"Grass, L.A. Superpressure balloon for constant level flight, Teck rep., Air Force Cambridge Research Laboratories, Office of Aerospace Research, United States Air Force, L.G. Hanscom Field, Mass. 1962."

"Koziell, L., Zhao, L., Liaw, J., & Adamiak, K. Experimental studies ofEHD lifters, in: Proc. ESA Annual Meeting on Electrostatics 2011."

"Kuroda, V. M., Allard, M. R., Lewis, B., Lindsay, M. Comm for small sats: The lunar atmosphere and dust environment explorer (LADEE) communications subsystem, 2014."

"Liang, Tsorng-Juu, et al. ""Novel isolated high-step-up DC-DC converter with voltage lift."" IEEE Transactions on Industrial Electronics 60.4 (2013): 1483-1491."

"Massa, A., Oliveri, G., Viani, F. & Rocca, P. Array designs for long-distance wireless power transmission: State-of-the-art and innovative solutions, Proceedings of the IEEE 101 (6) (2013) 1464-1481. doi: 10.1109/JPROC.2013.2245491."

"McSpadden, J. 0. & Mankins, J.C. Space solar power programs and microwave wireless power transmission technology, IEEE Microwave Magazine 3 (4) (2002)46-57. doi: 10. I 109/MMW.2002. 1145675."

"Randel, W. J. Global atmospheric circulation statistics, 1000-1 mb, Tech. rep., National Center for Atmospheric Research, Boulder, CO. National Aeronautics and Space Administration, Washington, DC. National Science Foundation (Feb. 1992)."

"Shibata, H., Watanabe, Y., Yano, R. & Suzuki, K. Numerical study on fundamental characteristics of electro-hydrodynamic thruster for mobility in planetary atmosphere, in: Transactions of the Japan society for aeronautical and space sciences, aerospace technology, vol. 12, 2014, pp. 5-9."

\* cited by examiner

GEOSTATIONARY HIGH ALTITUDE PLATFORM

FIELD OF THE INVENTION

The invention relates to the field of telecommunication, specifically to high-altitude platforms used for observation and transmission activities.

BACKGROUND OF THE INVENTION

The global high-altitude infrastructure which makes possible our modern digital, wireless world with services such as mobile phones, internet and GPS heavily utilizes space satellites in orbit. Satellites can observe large sections of the Earth at one time and instantaneously transmit signals over vast distances and across the planet, circumventing mountains and tall buildings. The satellite industry is worth over $200 billion dollars a year and is growing rapidly.

Constructing satellites and their payloads can cost millions of dollars. They are made extremely durable and resilient to, inter alia, survive launch force. Further, they are currently designed and built with the mindset of "launch it and forget about it", because there is no cost-effective way to retrieve a satellite or do any physical maintenance or upgrades.

Launching a satellite is even more expensive: $100 to $300 million dollars each. Historically this was only performed by governments. Now, many private organizations and ambitious entrepreneurs are starting private space companies with the hope of creating improvement, but the costs are still huge.

The satellite business is also getting dangerous. Space orbit is getting crowded, with dozens of countries currently operating over 1,200 satellites (not to mention abandoned ones) and over 60 thousand pieces of space debris. Further, with no international agreement on orbital paths, collisions happen, and they can be devastating. Astronauts on the International Space Station frequently have to go into their "life boats" during impacts.

BRIEF SUMMARY OF THE INVENTION

The invention, according to one aspect, presents a solution in the form of an alternative to satellites and drones: a high-altitude balloon platform that can stay up in the sky, in one place, for indefinite periods of time. The balloon craft holds up a payload to allow for the performance of the desired high-altitude services, just as a conventional satellite or drone would facilitate.

The present invention includes a lightweight superpressure ultra long-duration (ULD) high-altitude balloon (HAB) platform for deployment to a target altitude. The altitude chosen in this embodiment is 25 km. Electrohydrodynamic (EHD) thrusters are presented to maintain position by overcoming stratospheric winds. Critical to maintaining position is a continual supply of electrical power to operate the on-board propulsion system. A solution is to deliver power wirelessly to the craft from a ground-based transmitter. Microwave energy, not heavily attenuated by the atmosphere, can be provided remotely from a ground-based generator (magnetron, klystron, etc.) and steered electrically with an antenna array (phased array) at a designated frequency (such as 2.45 or 5.8 GHz). A rectifying antenna ("rectenna") on the bottom of the balloon converts waves into direct current for on-board use.

Throughout this discussion, the environment in which the craft operates will be described through reference to Cartesian coordinates in three-dimensional space. Herein, the z-axis will refer to vertical translation above the Earth, regardless of latitude or longitude. The variables x and y axes may be used interchangeably to understand horizontal position, either in the North-South or East-West directions. However, for simplicity, the terms North-South and East-West will be used more often than x and y, to ensure clarity.

The craft is launched from the ground and can fly into position at less than one g. The craft stays at the chosen altitude due to the buoyancy of the superpressure balloon. The craft will maintain lateral position with a series of re-engineered low-power electric thrusters which use air—not fossil fuels—to operate, thus not requiring any propellant refueling.

For safety and to allay fears, the beam can be turned off automatically if anything is in the area, while onboard batteries temporarily take over. In another embodiment, multiple transmitters can be utilized, so that some beams can be deactivated while objects pass through, while other beams maintain continual power supply.

The embodiment shown herein is designed to operate at 25 kilometers altitude, achieved by design of the size of the superpressure balloon shell, which will be disclosed further below, although the shape and size can be varied to achieve an altitude higher or lower. The chosen altitude has no lateral activity except for the occasional weather balloon. The altitude is 10 kilometers above weather and air traffic, and 30 kilometers below the typical limit of atmospheric meteor penetration. This altitude is chosen also for the advantage of minimal wind resistance, reducing power consumption and optimizing device performance.

From this altitude, the craft, with its continual power supply from the ground-based power transmitter, can provide a substantial cone of ground coverage over one thousand kilometers in diameter, resulting in nearly one million square kilometers range for observation and transmission services. Several duplicates of the craft, arranged at precise intervals to create slightly overlapping coverage, can enable coast-to-coast coverage.

The craft can be directed to ground in a controlled manner as required for regular maintenance and payload upgrades or replacement. A regular ground visit every 4 to 6 months is reasonable, given current capabilities of commercially-available superpressure balloons.

Value to Users

A geostationary balloon platform located at high altitude could offer economically and strategically advantageous methods of data collection and transmission compared to orbiting space satellites, telecommunication towers, unmanned aerial vehicles (UAVs) such as drones, and other forms of high-altitude balloons. Such a platform as described herein could provide high-demand services such as high-capacity wireless broadband internet distribution to remote and under-serviced regions while also enhancing line-of-site propagation transmission. Other potential applications include search-and-rescue operations, disaster relief, national defence, border patrol, intelligence, surveillance and reconnaissance gathering and relaying, emergency communication restoration, remote sensing, surveying and mapping, forest-fire and other disaster detection, environmental monitoring, climate and science research, astronomy, meteorology, and education.

The platform could provide a relatively easily deployable, long duration, sustainable solution for many high altitude services valuable to both scientific and commercial endeavours. The platform offers more power (kilowatts, and conceivably megawatts, instead of watts or milliwatts), longer flight times (months instead of days or hours), stable position, minimal ground footprint (no long runways) compared to unmanned aerial vehicles (UAVs). The balloon is also easily movable to a new position, a significant advantage over telecommunications towers. The geostationary balloon can also offer uninterrupted service by means of multiple balloons working collaboratively in a region.

The platform can be positioned at high-altitude, anywhere in the world, and deployed relatively rapidly.

Ultimately, the present invention may solve the problem of space crowding in a simple and more environmentally friendly way by transferring operation from orbital space to the stratosphere, and not contributing to the pollution of space launches and orbital debris.

Value to users includes: Resolving the serious and urgent problem of over-crowding in space orbit; payload retrieval for repair or replacement; relatively low cost, complexity, and risk; relatively rapid deployment; no mechanical moving parts, relatively invisible to infrared sensing, minimal or no waste heat, relatively relaxed payload design constraints; relatively invisible to observers at ground level; no fossil fuels, no waste pollution; will not interfere with air traffic, weather, or space activity during normal operation; and will not crowd the operating region of the stratosphere.

DETAILED DESCRIPTION

Figure 1:
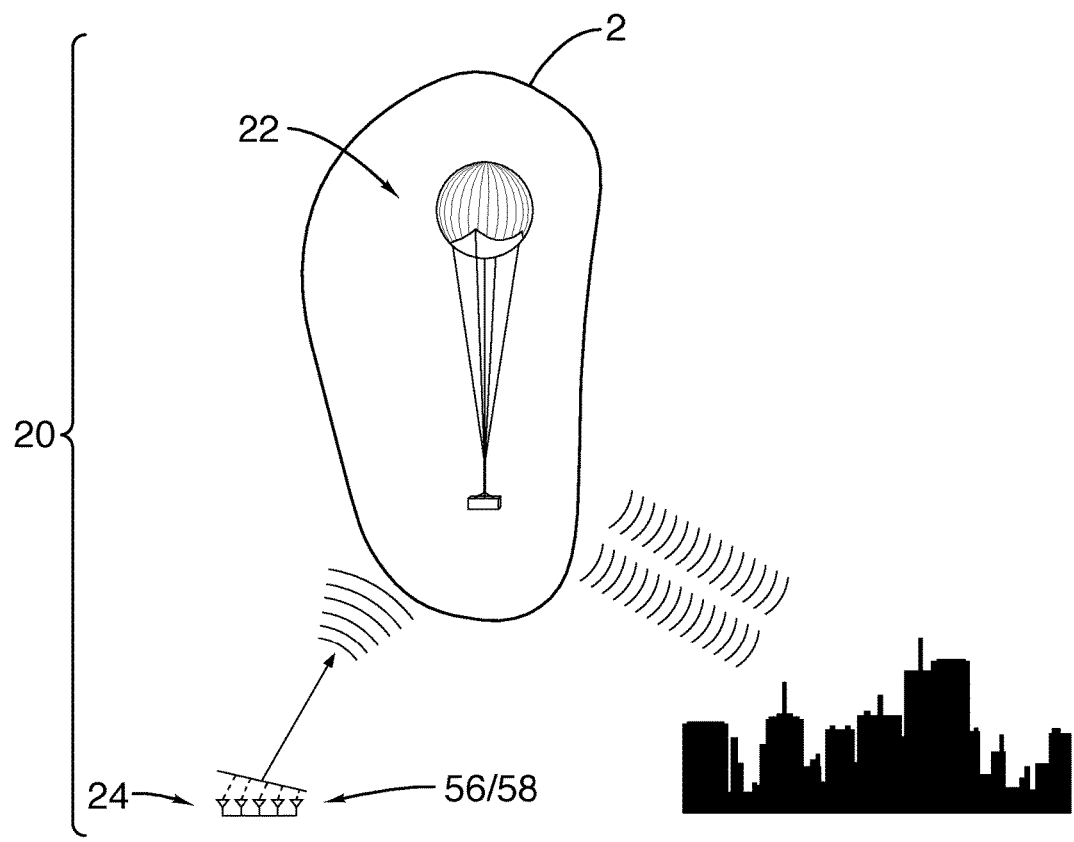
FIG. 1 is a schematic view of a system according to an exemplary embodiment of the invention.

As shown schematically in FIG. 1, the system 20 comprises two primary facets: an air-borne craft 22; and ground-based components 24.

The functions and structures of the components of the air-borne craft 20 are described in detail as follows.

Balloon

Figure 2:
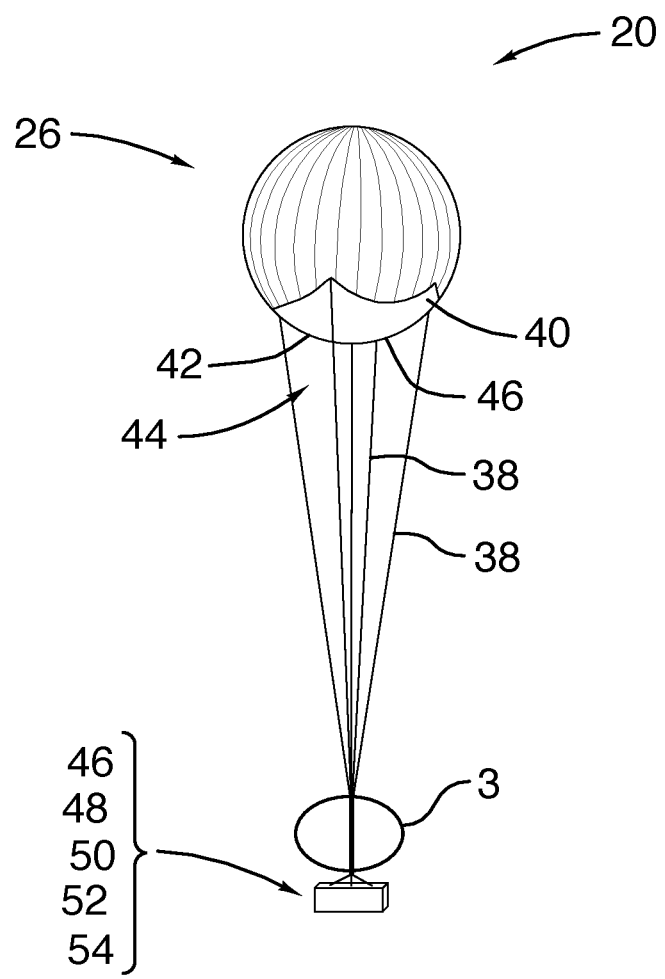
FIG. 2 is an enlarged view of the structure of encircled area 2 of FIG. 1

The craft 20 includes a superpressure balloon 26, as shown in FIG. 2. A superpressure balloon is a sealed, plastic cell that floats at a constant density altitude, despite ambient temperature fluctuations between day and night. Internal pressure of the lighter-than-air gas is kept at a greater value ('super') than ambient pressure at all times to ensure buoyancy, without significant change in volume. Embedded ropes ensure that the balloon volume is roughly constant at the target altitude (Grass, 1962). Helium is generally preferred as a lifting gas over hydrogen to prevent combustion.

Design of the superpressure balloon depends on various criteria including atmospheric drag, operational efficiency, cost, material strength, and ease of manufacture. Balloon skin is typically made of very thin, lightweight, durable material such as Mylar or 1.5 mil co-extruded LLDPE film. A sphere shape is preferred for superpressure applications as the sphere retains the highest values of internal pressure for a given maximum safe stress on the material. Research in the past two decades has shown that the elastica or pumpkin shape can also be a viable alternative shape, from material strength and durability perspectives However, drag is a critical consideration when selecting optimal shape for long duration flights. While a sphere is high in drag compared to elliptic shapes such as the dirigible or blimp, the sphere offers the advantage of consistency in drag, in all three axes. A uniform balloon will respond equally to wind forces in all three directions, including down and updrafts, without having to change direction to minimize drag. This approach will not burden the thruster and communication systems with constant maneuvers, or risking damage from twisting and contorting. For the proposed station-keeping system described in this study, based on uniformity of drag as a primary design consideration, the sphere is chosen for this specific embodiment.

Propulsion Mechanism

A propulsion mechanism is incorporated into the present design to maintain lateral station-keeping against high-altitude winds, namely, a series of electrohydrodynamic (EHD) thrusters 28. Such devices are lightweight, cost-effective, air-breathing thrusters. They possess no mechanical moving parts to help prevent against wear, fatigue, and risk of failure in the cold temperatures of the stratosphere. EHD technology has been well-understood for decades.

Figure 5:
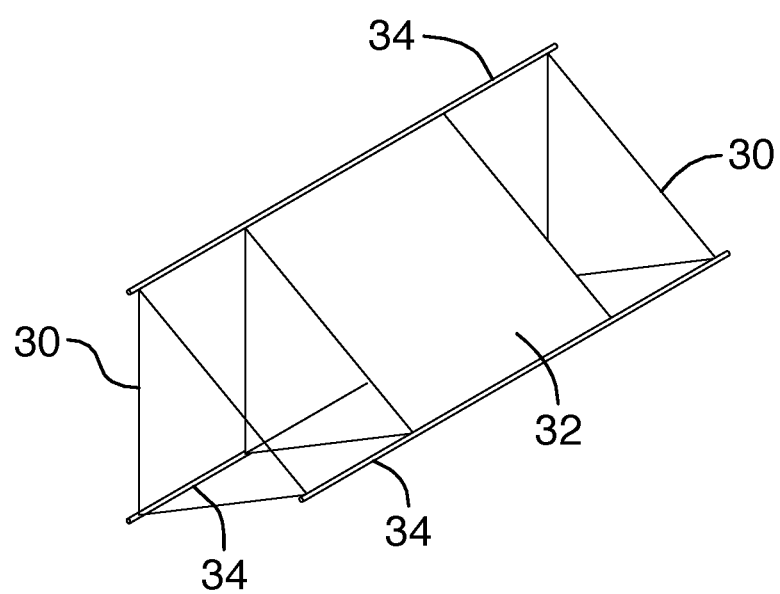
FIG. 5 is an enlarged view of the structure of encircled area 5 of FIG. 4.

The EHD thruster 28 is a lightweight structure made up of a thin wire 30 and a thick aluminum sheet 32, both arranged as triangles and held together by a lightweight dielectric such as balsa wood. The design depicted in FIG. 5 is based on Masuyama et. al. (Masuyama, 2013). A long wire (40 cm between balsa posts 34) 30 made of 35 standard wire gage (SWG) is charged to +/−40 kV relative to the grounded collector plate 32 made of a coaxial sheet of aluminum. Optimal separation distance between wire and plate was found to be 23 cm.

With the application of high voltage (30 to 40 kilovolts), ambient air particles are ionized at the emitter and accelerate toward the collector, colliding with neutral particles to exchange momentum but not charge. The ions recombine at the collector to complete the circuit, but the neutral air molecules continue through the device, providing thrust in the opposing direction.

FIG. 5 illustrates a modified version of the Masuyama (Masuyama, 2013) design, with an additional emitter wire 30 to enable propulsion in either forward or reverse direction. This novel feature can assist with steering, balance, or stopping the craft, for travel and station-keeping purposes. The wiring and programming should be created such that the "forward" emitter wire and collector/ground wires are activated together or alternatively the "back" emitter wire and collector/ground wires are activated together, but never any other combination of these three elements for risk of electrical failure, short, or wasted energy. When one of the two emitter wires of the thruster is engaged along with the ground collector plate, then the thruster will be propelled in the direction of the active emitter wire.

In this embodiment of the present invention, all thrusters are aligned on the scaffold such that they face the same direction. Thus, when all thrusters on all ladders of the scaffold are activated in the same direction, then the craft will be propelled in that direction. Conversely, if some thrusters are activated in one direction while other thrusters (on a different ladder or at a different position on the same ladder) are activated in the opposing direction, then the craft will perform a rotation or sway.

In use, a determination may be made to rotate or sway the craft based on its current position, vector, velocity, acceleration, or orientation. For example, the craft may need to be turned into the wind, or straightened out from an angle or tilt, or may be experiencing stronger winds at one vertical position than another, and different magnitudes of thrust are required at different elevations to maintain vertical erectness.

Each individual thruster offers less than one Newton of thrust, but only weighs on the order of grams. The total number of thrusters needed to ensure adequate station-keeping will depend on the force required to counteract high-altitude winds, and is explained in detail further below.

Scaffolding

EHD thrusters require clear air flow in the front and out the back. A scaffold 36 is presented in this embodiment of the present invention which hangs down from the balloon 26 and carries a large complement of thrusters 28. This scaffold consists of a series of ladders or trusses made of lightweight material.

The scaffold can be enlarged at the base akin to an inverted pyramid. This inverted pyramid model provides aerodynamic advantages, since the thrusters are more spread out near the top of the balloon, which itself is a source of drag. Therefore, a further spread out complement of thrusters nearer to the balloon and at the top of the scaffold than further away from the balloon toward the bottom of the scaffold, will allow the thrusters to help compensate and ensure that the balloon does not become warped or bent as it traverses, and does not fall behind and risk adding strain to the craft and possibly tilt and thus misdirection to the intended path of travel. In addition to an inverted pyramid, a larger complement of thrusters at or near the balloon, at the top of the scaffold as opposed to at the bottom of the scaffold helps place the centre of mass further away from the balloon, so that it will not cause drag and potential tilt or misdirection.

The scaffold ladders 36 are attached to the balloon 26 by harnesses 38, secured to protrusions 40 emanating from the balloon 26. Such attachments will need to be conducted in such fashion that the scaffold ladders do not twist and contort, but rather are secured from rotating. One way to do so is to include several harnesses attached to several protrusions for each ladder, ensuring the prevention of a z-axis rotation.

Additional embodiments of the scaffold include an upright pyramid in which the individual ladders emanate from a central spot on the bottom of the balloon, and fan out toward the bottom. At such a bottom could be a large platform. This design may be beneficial if a client required a large platform or some form of large area activity at the bottom of the balloon. This design would also be beneficial if the constructor wanted to place the power receiving antenna away from the balloon, or at the bottom of the craft in this matter, or needed the power closer to the client payload, or needed the payload above the receiver, or any other possible reason to have a large base.

Each ladder can house a number of thrusters, all facing the same direction. In another embodiment, different ladders could be mounted perpendicular to each other so that a percentage of the total thrusters would face "North/South" while the remaining set would face "East/West" to allow for a different form of control, in all directions simultaneously.

In this embodiment, thrusters would be separated from each other along the truss by a minimal distance so that they do not interfere with each other. In other embodiments, the thrusters might be directly connected to one another to save space and thus mass.

Thruster disbursement and quantity can be increased or decreased as is deemed necessary to account for different anticipated wind flows, drag resistances, or other parameters.

In one embodiment, the scaffold can be hollow to reduce excess mass burden. Scaffold should at the very least have some decree of cavity to allow for electrical wiring, running from the thrusters (and any sensors chosen to be placed along the scaffold) up (or down) to the power supply and voltage conversion components, located near the rectenna.

Rectenana

Energy transmitted wirelessly from the ground will be received onboard the craft by a thin-film rectifying antenna ('rectenna') 42.

This thin film material can be affixed to the balloon by forming it onto a rigid or flexible truss which is attached onto the balloon by straps, connectors, or some other method to the protrusions on the balloon. Conversely, the thin film rectenna may be directly imprinted onto the balloon skin by lithography. Other methods, both existing and yet to be conceived may be employed to safely and securely connect the rectenna to the balloon. In another possible embodiment, the rectenna may be hung down from the craft, so that it is carried below the thrusters, and/or on the bottom and sides of the client payload.

In yet another possible embodiment, the rectenna may also be carried within the balloon skin, either affixed or hanging from the top, or simply contained somewhere within. It may be found, however, that it is more advantageous to keep the two technologies (balloon and rectenna) completely separate entities, for ease of replacement of one or the other, and to manage heat flow through the balloon. Such a decision is left to the discretion of the manufacturer, and might be influenced by many factors including, but not limited to: mass management and distribution, angle of the power beam, and concerns of signal interference against the communication system and client payload operations, among other issues.

A rectifying antenna (or "rectenna" for short) converts EM waves to direct current. A valuable primer on the technologies and design of wireless power systems is provided by Shinohara (Shinohara, 2014). The rectenna, developed in the 1960s, consists primarily of an antenna, filters and Schottky diodes. The dipole antenna receives and converts microwaves to direct current (DC), while the band-pass or low-pass filter minimizes unwanted signal. A Schottky diode rectifies the signal induced in the antenna to produce DC power. A DC filter further refines the signal. The device then powers a load connected across the diode. Some rectennas have demonstrated 85% efficiency when converting and delivering energy, showing DC power output densities of 1 kW/m$^2$ and DC power-to-weight ratios of 4 kW/kg (Brown, 1984).

The rectenna may be etched on thin films to significantly reduce mass. Sheets of printed circuit can be industrially produced on rolls and unravelled prior to (or during, or after) balloon deployment. Thin film rectenna components can be fabricated using flexible, cost-effective materials such as organic semiconductors.

Onboard Power Management System

Power received by the rectenna will not necessarily be of the voltage level needed by the EHD thrusters (on the order of 0 to 40 kV (Masuyama, 2013). Accordingly, step-up voltage converters may be used to generate the high voltages. These converters 44 will be placed near the rectenna, on the bottom of the balloon so that voltage is amplified while en route to the thrusters.

Communication System

The craft will include a communication system 46 to transmit and receive information which may or may not include instructions, to and from the ground station. System can consist of, but is not limited to: a transceiver, capable of sending and receiving information, and a transmitting antenna, preferably of lightweight design.

There are many transceiver options available which are already well-established within the high-altitude balloon industry. Transmission antennas can include, but are not limited to phased array antennas, and all of the antennas discussed in the power transmission section, below. Many options are available for combinations of different transceiver and transmission antenna choices, and the goal of the design is to allow the constructor an ideal range of choices to best suit the particular communication needs of their embodiment, considering factors such as (but not limited to): transmission distance, power usage, signal-to-noise ratio, security factors (encryption, exclusively of access to the communication EM beam), and many other possible factors. Frequency allocation for communication should be determined based on appropriate regional legislation governing electromagnetic frequency spectrum allocation, and must also be carefully selected so as not to interfere with the frequency of wireless power transmission.

The craft communication system must be capable of communicating with the ground station radar facility to transmit craft health and status, position, vector and other information, and to ask for instructions when deemed necessary by pre-programming, for course corrections, emergency landing authorization, or other issues of importance. The ground-based system is discussed further below.

Control System

The balloon system will be pre-programmed to operate autonomously, with the goal of maintaining craft position by activating thrusters to counteract winds. Programming can consist of computer instructions written into a CPU which when evaluating the position, vector, velocity and acceleration of the craft, send instructions to activate and/or deactivate specific thrusters so as to change course and speed to achieve the desired position.

An on-board computer 48 including the CPU will evaluate all sensor data to determine if activation of certain thrusters is required to reposition the craft. If the computer system identifies itself as traversing laterally away from the origin point beyond a certain threshold (such as the maximum detectable variation in GPS signal) then the appropriate thrusters will be activated in the opposite direction to counter the flow. When the craft is near to the target destination, the computer will switch those same thrusters to operate in the reverse direction, to counter the forward thrust and slow the craft to a stop.

Sensors

The craft carries a complement of sensors 50 for a variety of functions. In this particular embodiment, individual ladders of the scaffold hanging down from the balloon can each carry a compliment of sensors, uniformly-distributed up and down, in order to determine position, velocity, and acceleration of each ladder relative to one another, and to the craft overall, and to the point of origin where the craft will endeavour to remain. Also in this embodiment, an additional set of sensors will be carried on board to determine if the craft has drifted away from the origin point. This service will also require a reference point or service on which to base the decision of position. To that end, the present invention will require either collaborative efforts from a ground station which can transmit a homing beacon, or some other form of landmark to use as a reference point including, but not limited to, a distinct object (in the sky or on the ground or at the horizon), a reference point in space, a GPS signal or series of signals, or some other means of localization. In this particular embodiment, sensors can include but are not limited to: accelerometers, magnetometers, GPS positioning systems, thermometers, and altimeters to provide feedback for positioning and altitude. The goal of this particular complement of sensors is to determine the above position, vector, velocity and acceleration conditions in order to guide the craft to the desired destination. However, any additional sensors could also be included to assist with guidance as well as other functions. Any type of sensors could be placed at any position on the craft to assist with these processes including, but not limited to: on the balloon, the scaffold, the thrusters themselves, or the client payload compartment.

All of the sensor technologies and procedures discussed above are commonly found in industry practice on high-altitude balloon craft. Accelerometers will measure proper acceleration (gravitational force) to determine altitude and orientation, and coordinate acceleration, vibration, and shock. Accelerators are a well established technology, often used for inertial navigation systems for aircraft and missiles as well as in tablet computers, digital cameras and some video game controllers. Magnetometers determine the strength of the Earth's magnetic field and will be used to confirm altitude and position. Global positioning systems (GPS) will evaluate longitude, latitude, altitude, and time acquisition. Temperature sensors can monitor equipment within the craft, but also air temperature outside the craft to confirm altitude. Altimeters will measure atmospheric pressure, to further confirm altitude.

GPS accuracy for civilian applications in the United States (for example) offers a "worst case" pseudo-range (distance from GPS satellite to receiver) of 7.8 meters at a 95% confidence level (DoD, 2008). Assuming this worse case, GPS sensors will detect when the craft has exceeded this 7.8 m range in any given direction and thrusters will engage to return the craft to the origin, providing a minimum total range of motion of 191 $m^2$.

The ability of the craft to perform this precision flying will depend on the consistency of force generated from each individual thruster unit upon activation. Research among various groups (Shibata, 2016, Masuyama, 2013, Gilmore, 2015, Moreau, 2013, Koziell, 2011) has demonstrated that EHD thrusters can generate a consistent amount of thrust for a given input voltage and current. Further work will be required to verify such consistency within the low-pressure and low-temperature environment found at high altitude, and the consistency of time delay between activation of thruster and achievement of full thrust force, but the idea that electrohydrodynamic thrusters can offer precise station-keeping is sound.

Automatic on-board systems could be given even greater control of the overall balloon mission, such that the craft could independently determine if it should descend to the ground in the event of a emergency or problem such as loss of power, lack of communication, collision, impending collision, system fault, or some other problem. Override of such protocols from ground is also a possible option, subject to manufacturer desire and government regulations. The ground station can also contribute to positional stability by monitoring the craft and offering instruction.

Backup Battery System

In the event that there is a problem with, or an interruption to, the wireless power supply, or some reason that power cannot be supplied through the wireless transmission system, then one possible embodiment of the craft (and a recommended feature) is to include a battery backup system 52 to provide temporary, emergency energy. This system can provide energy to all, many, some, or a few of the components on board, such as the CPU, power conversion system, thrusters, communication system (sending and receiving), sensors, and the client payload.

The CPU can be pre-programmed so that in the event of an emergency in which wireless power is inaccessible, the on-board battery complement will be enacted, and will provide electrical energy to the system(s) of choice. The total amount of battery power desired, and the type of battery chosen (storage capacity, mass, recharge rate and number of chargers possible) will influence how many batteries are to be carried aboard the craft. Total energy demand will therefore influence additional carrying mass, and thus affect the design of the balloon and subsequent components. Detailed description of the design process is included further below.

In one possible embodiment, the on-board complement of batteries can be recharged by the wireless power system, so that when the wireless power system is restored (if it can be) then the batteries will be replenished for the next instance when they are required.

In one possible embodiment, additional computer programming can be implemented such that if the battery backup is engaged, or is operational for a certain period of time, then the craft can be pre-programmed to change it's objective (such as maintain position) and can instead take action to change position, return to a new position (such as the landing field), and can begin landing procedures. The craft could go so far as to carry out a complete landing in the event of loss of wireless power transmission. Override of this emergency service could be possible from ground if the constructor so chooses. A lock could also be provided so as to ensure that once a certain stage of emergency procedure has take place (such as landing procedure has commenced and the craft has reached a certain threshold distance from the ground) then the system cannot be overridden, if the constructor so chooses to implement.

Heating System

For electrical equipment to perform efficiently and reliably, it is advisable to operate equipment within its specified ideal temperature range, often found generally to be between 0 and +40 degrees Celsius and varying for other more sensitive or more ruggedized equipment. Given that the craft will experience external temperatures of −60 degrees Celsius on its journey up into the stratosphere (which is the target altitude of this particular embodiment) as well as on its way down, along with low temperatures within the stratosphere itself, it is advisable that sensitive electronics and equipment be housed in containers which offer some degree of temperature control, through heat generation as well as encapsulation. The high-altitude balloon industry already employs techniques such as insulated containers and heating implements to maintain a relatively warm temperature for the instruments. Some embodiments can be as simple as Styrofoam containers with or without small heaters. More complicated containing systems are also possible, in some instances relying on a source of energy.

Given that the duration of missions may be much longer than traditional balloon flights, and the prospect that enclosed electronics (CPU and data cards, sensors and instruments, etc.) might not generate enough waste heat to maintain optimal environmental conditions, then one possible embodiment of the invention would be to include lightweight insulating containers and incorporate heating elements, utilizing electricity to generate the precise amount of heat. Since electrical energy is plentiful (given that it is transmitted wirelessly) and mass is of prime concern when constructing a lighter-than-air craft, it is advised that electrical energy be utilized rather than some other form of energy source such as fossil fuels, which would increase payload mass, create an imbalance in mass from beginning to end of mission, and would require more frequent landings to replenish supplies.

Cargo Hold

The function of the craft in this embodiment is to carry a client payload 54 to a target altitude to perform services, such as high-altitude observation, transmission, and telecommunication activities. To that end, the balloon platform must carry aboard a client payload. Such a payload is not hampered by the design and construction limitations imposed by the rigors of space launch and orbital travel, but must nonetheless contain certain measures of protection, namely inclement weather and safety for landing.

If the client payload contains electrical equipment which is not already ruggedized for extreme environments, then the payload should most likely be encased in a lightweight, temperature-controlled container which will ensure effective and consistent operation of the client's electrical components, as described in the above section on temperature management. Further, the container should also offer support for the potentiality of aggressive impact with ground due to unforeseen rough landings or collisions with any external elements. Such protection might come in the form of (but is not limited to) foam, springs, shocks, absorbing pads, or some other means of absorbing and/or redirecting the force of an impact to protect the equipment housed on and/or within the payload container.

Figure 3:
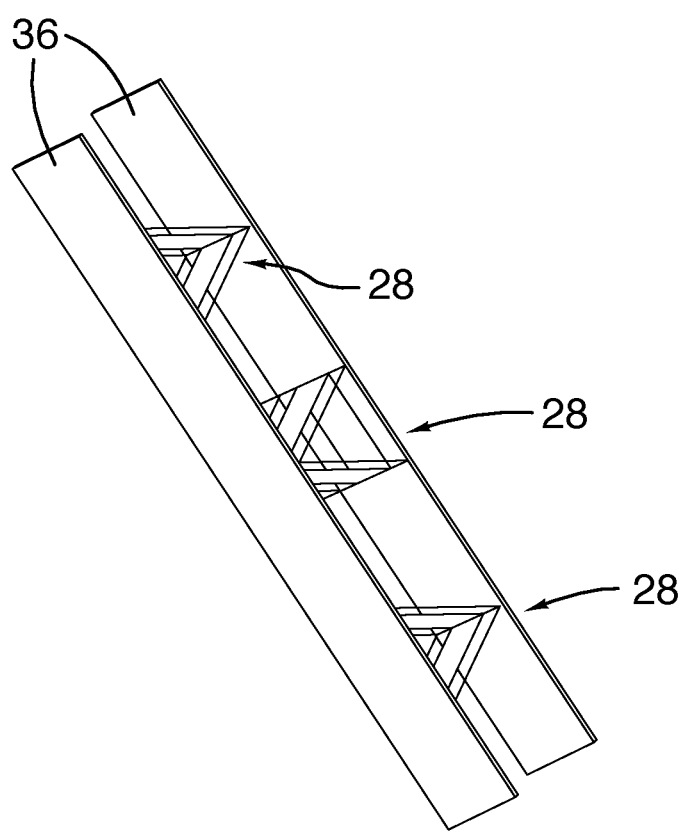
FIG. 3 is an enlarged view of the structure of encircled area 3 of FIG. 2
Figure 4:
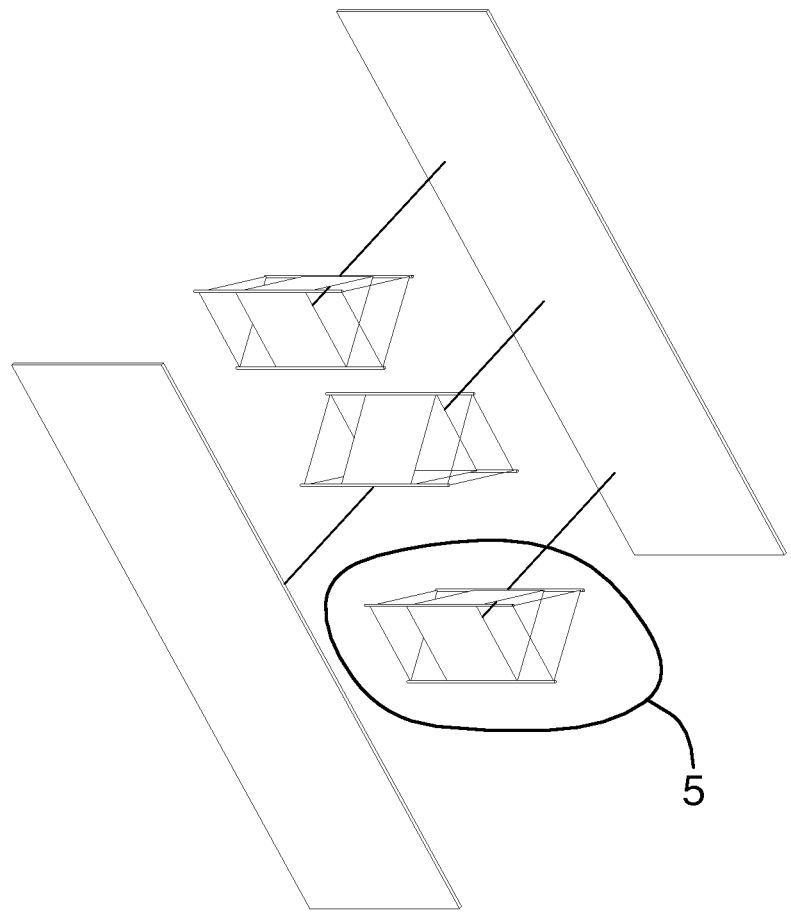
FIG. 4 is an exploded view of the structure of FIG. 3.

All of the aforementioned payload containers should hang down from the balloon, a safe distance away from the thrusters and power receiver. In one embodiment, the client payload can be housed in a container far below the thruster scaffold, as seen in FIG. 3. In other possible embodiments, the client payload may be ideally suited (ie. small enough and/or ruggedized enough) that it could be carried outside of a protective container, and in another position, such as directly on the balloon itself, or within the thruster scaffold (at one position or distributed throughout), or on the rectenna.

In the event of an emergency landing on water, one embodiment of the present invention would be to equip the payload compartment with flotation capability, to increase the potential for a successful recovery.

Parachute

In this embodiment of the present invention, the craft will carry one or more parachutes, ready for deployment to safely lower certain elements to the ground to reduce the risk of damage or injury. Such safety procedures are common practice with high altitude balloons. In this embodiment, one parachute is accounted for in the mass budget.

In the event of an emergency, the craft may be forced to return to Earth rapidly and unexpectedly, and may not have the option of a controlled landing. Alternatively, the client or operator may wish to return certain elements of the craft to the ground in an expedited manner. In such a situation, the parachute should be deployed, either automatically or by manual control and override. In such an instance, the parachute will be ejected from a storage compartment aboard the craft, as is practiced on modern high-altitude balloon craft. Common practice if a balloon is popped and destroyed is for the parachute to deploy, allowing the critical components to return safely to the ground for recovery unharmed, as well as without causing damage or injury to any elements at the landing site or along the journey downward.

Numerous parachutes can be stowed aboard the craft, to provide for a recovery of the entire cargo complement excluding balloon but including thrusters, scaffold, sensors, rectenna, and client payload. An alternative embodiment would have additional parachutes to specifically protect each of the aforementioned items, or specific collections of the above mentioned items.

Flight Termination Unit

In the event that the ground crew desired the payload or various components to return to the ground quickly, then an early termination of the mission would be possible by activating the flight termination unit. Such a device is also standard practice in the balloon industry, and can be as simple as a wire draped over or wrapped around the primary support rope that connects the balloon to the train of equipment below. The wire will be connected to a power source, and when the power source is activated, the wire will overheat, burning the supporting rope until it breaks and severs the tie between the balloon and the rest of the payload and components.

Recovery Beacon

In the event of an emergency landing, it would be advisable to include a means for finding the downed craft and components.

In one possible embodiment, each section which is separately housed, or could become separated from the main body due to its specific design and construction, could be equipped with a homing beacon that would transmit the location of the component to ease in searching and recovering. Such a beacon could be always-on, or could be activated either automatically (such as when the craft descends below a certain altitude) or manually by the ground crew or some other party with the appropriate authority and control. The beacon could be of numerous designs that are in wide use for applications such as search and rescue. Types of beacon could include, but are not limited to: mobile phone, tracking transmitter, distress radio-beacon, transponder, hydrostatic release unit (HRU), GPS beacon, high-precision registered beacon, emergency locator transmitter (ELT), location by Doppler (without GPS), and emergency position-indicating radio-beacon station (EPIRS or EPIRB), among others.

Although the models and particulars may vary, the function remains the same; that of providing a signal over a prescribed distance of the location of the craft remnants in order to aid the search party in recovery.

Use of emergency beacon technology may come with regulatory restrictions and limitations in some regions. Choice of beacon may be affected by such factors.

The functionality of the ground based components is as follows:

Electrical Power Source

In order to transmit the amount of power required to the craft, the ground station will require access to sufficient quantities of electrical energy. Such energy may be obtained from the local electrical grid, upon solidifying the appropriate arrangements with energy power providers and the appropriate authorities, governing and regulatory bodies and other stakeholders in the region. Alternatively, power may be brought to the ground station by means of portable, semi-portable, or permanent industrial power generators including, but not limited to: diesel, natural gas, petroleum, portable industrial generators, marine generators, or heavy fuel oil generators. Renewable energy sources including solar, wind, geothermal or synthetic or bio fuels may be considered, so long as they are accompanied by the appropriate type and quantity of batteries for energy storage during non-harvesting times.

Ground Station Power Generator

The ground-based system will include a power generator 56, which could operate in numerous frequency ranges such as visible, UV, IR, near-IR, mid-IR, far-IR, radar or microwave, among others.

In this embodiment, a microwave generator is chosen, in particular operating at a frequency such as 2.45 or 5.8 GHz. Such frequencies are within the industrial, scientific and medical (ISM) bands, and are chosen in this embodiment for their international acceptability. Microwave transmitting devices can be classified as either Microwave Vacuum Tubes (magnetron, klystron, travelling wave tube (TWT), and microwave power module (MPM) or semiconductor microwave transmitters (GaAs MESFET, GaN pHEMT, SiC MESFET, AlGaN/GaN HFET, and InGaAS). The magnetron, a well established technology, is widely used for experimentation of WPT. It consists of a high-powered vacuum tube in which electric current runs along a heated cathode wire through a conductive anode cavity. Specially-sized holes in the cavity cause resonance, producing EM waves of the desired wavelength. The magnetron is small, compact, and cost-effective, with a long history of success (Brown, 1996, Wathen, 1953), and has been recommended for use in other wireless power transmission applications (McSpadden, 2002).

Power Transmitter

A transmitter will propagate the electromagnetic power signal skyward in a reasonably confined manner so as to minimize size of transmitter, reduce waste power expenditure, and minimize the risk of harm elsewhere or atmospheric heating, among other possible motivations. Choice of transmitter will be dependent on the frequency selected for power transmission.

In some embodiments, a laser may be employed to generate electromagnetic waves or pulses in the visible, UV, IR, near-IR, and far-IR ranges, among others. In another embodiment, microwaves and radio waves could be the targeted power transmission frequency ranges, namely between 1 and 10 GHz. This particular embodiment will use microwave frequencies, with options presented for 2.45 GHz and 5.8 GHz. Thus, a microwave generator as well as a large antenna for transmission will be required for this embodiment.

Many antenna options are available including, but not limited to: wire antennas such as short dipole, dipole, half-wave dipole, broadband dipole, monopole, folded dipole, loop, cloverleaf; as well as travelling wave antennas such as helical, yagi-uda, spiral; reflector antennas such as corner reflector, parabolic reflector and/or dish; microstrip antennas such as rectangular microstrip and/or patch, planar inverted-f antennas (PIFA); log-periodic antennas such as bow tie, log-periodic, log-periodic dipole array; aperture antennas such as slot, cavity-backed slot, inverted-f, slotted waveguide, horn, vivaldi, telescopes; other antennas such as NFC, fractal, wearable; and any additional unmentioned antennas.

In addition to individual antennas, numerous antenna arrays (either parasitic or driven) are viable options for wireless power transmission including, but not limited to all of the aforementioned antennas combined into arrays, as well as phased arrays, retrodirective arrays, smart antennae, interferometric arrays, and Watson-Watt/Adcock antenna arrays.

Numerous antenna arrays have already been proposed for wireless power transmission in the microwave range (Massa, 2013, Ren, 2006) which include but are not limited to the phased array and retrodirective array antennas. The power transmitting antenna presented in this embodiment of the present invention is a phased array antenna, composed of a series of antenna elements, each of which has a phase shifter.

Beam steering is accomplished by changing phase slightly for each element, in succession. The main beam points in the direction of the increasing phase shift. The overall signal is amplified by constructive interference, while beam sharpness is improved through destructive interference. A phased array antenna system laying flat on the ground will provide up to 120 degrees of transmission in azimuth and elevation (out of a possible 180 degrees) or expressed as a maximum 60 degree tilt in a target direction. Steering occurs electrically with no mechanical moving parts, allowing for rapid direction adjustment, effective operation in extreme and harsh environments, and reduced wear on components.

An additional transmission option for an alternative embodiment of the present invention is the retrodirective array antenna which automatically transmits microwave power (or any signal) back in the direction of the pilot signal without prior knowledge of the pilot signal origin. A signal can be sent down from the balloon craft to serve as the incident pilot beam, and the retrodirective array on the ground could automatically return power in the direction of the original signal. This requires less computationally intensive algorithms or hardware to achieve significant transmission. Retrodirective arrays are of growing interest due to their relative simplicity compared to phased-arrays. A demonstration of the effectiveness of retrodirective arrays as power transmitters has been provided by Mankins (Mankins, 2014).

Ground Communication System

In order to communicate with the craft, the present invention will include a ground station 58 possessing a radar system including (but not limited to) a transceiver and an antenna, plus a CPU and interface to monitor the craft, and issue override instructions as needed. The communication system will also include a radar system to detect and monitor the craft, as is commonly employed in radar applications over long distances for military and aircraft logistics.

Such a ground station may be adapted from existing processes and procedures for ground-based facilities that communicate with aircraft, drones, and space satellites. A ground station then may already be in existence, and therefore purchased, or alternatively rented or leased for the duration of the operation of the craft.

Conversely, a station may need to be constructed or modified which will require acquisition of land, permits, public disclosure, and design, construction, and operation of such a station with all appropriate accompanying parameters including (but not limited to) physical construction and insulation, electrical power, utilities, safety, security, road access, comfort and convenience for human occupants, and corresponding inspection protocols and procedures as would accompany any typical construction project of a housing or workplace structure of this nature.

Power Transmission Station

Transmitting wireless power will require an infrastructure to house and support the transmitting antenna, which may or may not be incorporated into the communication system. As a separate entity, the power transmission station will require the use of a plot of land of a suitable dimensions to house the transmitting antenna with excess space as is required to prevent energy leakage to the nearby surrounding area. The station will also require a physical workspace for human occupants, power facilities, utilities, security, living quarters, maintenance and cleaning supplies and tools, reserve and backup equipment and supplies and their corresponding storage facilities, and general storage facilities, as would be anticipated with any similar remotely-based operation requiring high power output such as the Arecibo observatory and radio telescope in the municipality of Arecibo, Puerto Rico.

Operational Considerations

In the event of an emergency with the craft, in which a change becomes necessary for craft position, altitude, direction or some other aspect, then the CPU can be programmed to automatically carry out a pre-ordained change, or receive instructions from the ground (either original or overriding) to make a change of craft behaviour.

Possible emergencies that might occur include, but are not limited to: failure from external factors such as inclement weather, high winds, excessive heat or cold, natural disasters (eg. volcano, volcanic ash, hurricane tsunami, or typhoon), collision with foreign object (eg. aircraft, or other human-made artefact, animal or bird, terrain, space-borne phenomena such as asteroid, meteor, space debris), external attack (eg. missile, plane, explosion shrapnel, or other weapon or combative effort); and failure from internal factors such as the failure of any one component or collection of components (temporary, requiring either physical or remote intervention by humans, or permanent) which leads to a critical failure in the craft ability to carry out the mission, requiring specific change in activities.

Possible changes in activities that might be required of the craft include, but are not limited to: changes in position or course, direction, velocity, acceleration, or altitude. A craft may be programmed to automatically travel to a new or previous location, to land, or to sever the connection to the payload and drop it, via parachute, to land or sea. The users or clients may be so inclined to do so for matters of sensitivity or security of the payload, its information, position, capabilities, or other sensitive factors.

Details of the various threats, and the proposed programming required to overcome these challenges, are presented next.

Beam Avoidance

A beam of wireless power may be of substantial energy density which could potentially inflict harm on biological tissue if exposed, either directly or indirectly, for a certain period of time. Because different embodiments of the present invention may call for greater or lower degrees of energy intensity, it is in the domain of the constructor to ensure adherence to all legal and regulatory matters. Safety to life, particularly human beings, is of paramount importance, and the present invention should be constructed with safeguards in place to ensure that operation does not lead to harm.

To that end, in the event that objects approach or enter the path of the wireless power beam, the present system will be equipped with a means of ensuring that no harm comes to that passing craft, person, bird, animal, or other object, on an automatic and ongoing basis which does not cause undo wear or burden on the system, or lead to early failure or need of repairs. In the present embodiment, the invention is presented with a means of automatically turning off the power beam in the event of a passing object, to guarantee that no harm comes to that object.

In this embodiment, the ground communication system, which will be equipped with radar to track the craft's position (as discussed in detail elsewhere) will also utilize that radar to track other objects in the sky near to the beam. In the event that this radar system finds an object coming into range of the beam, then the ground station computer will determine how long until the object is within range of the beam, and terminate power transmission. The radar will indicate when the object has passed by the danger zone, and inform the computer, which will then reactivate the power beam.

In order for the craft to continue operation while the beam has been terminated, onboard backup batteries will be required on the balloon craft to ensure continued and uninterrupted functionality. In this embodiment, additional protocols may be put in place, such that the craft's CPU may be programmed to take emergency actions if power is not restored within a certain amount of time, such as (but not limited to) travel into the wind, either before beam termination or after, in order to give the craft time to loft back into the ideal position; return to a certain position; begin landing procedures; execute a complete landing.

An alternative embodiment would be to operate multiple ground stations, each with their own independent power transmitters. Any power beam could be deactivated while an object passes through its range, while another beam or multiple other beams located at a safe distance away would be activated in the original beam's place, thereby ensuring a continual supply of power to the craft without endangering passing objects, and not requiring the same extent of onboard batteries for energy storage. Deciding whether to include this aspect of the invention will depend on many factors including, but not limited to, costs of ground stations, power transmitters, electricity rates, land acquisition ability, and various permits and regulations, in contrast to the costs and complexities of additional battery carriage.

Harsh Environment

The balloon craft will operate in a harsh environment. The journey to the cruising altitude in the stratosphere can subject the craft to temperatures that range from 30 Celsius to negative 60 Celsius. To ensure that all components function optimally in these conditions, all phases of the design will be put through realistic computer simulations. Modelling will demonstrate the durability and survivability of the balloon and scaffolding structure, as well as thruster effectiveness, in these extreme cold conditions with strong high-altitude winds. A particular advantage of the geostationary balloon is that there are no mechanical moving parts. The propulsion system operates by the transport of air by electric means, so there are no rotating or turning parts which risk freezing and malfunctioning. All components which are temperature sensitive will be kept in climate-controlled containers to ensure optimal performance.

Natural Disasters

The natural world can wreak havoc on any technology, and the balloon, despite its lofty position safely above clouds and air traffic, is still no exception. The balloon is susceptible to volcanic ash which can rise up to the intended operating height. The balloon would need to be moved well out of the way of the ash cloud for as long as it takes for the dust to literally settle, which could be on the order of days, or weeks, or in extreme cases, months. During that time, the balloon will likely fail to provide all of its intended services to customers but there would also be an unavoidable loss of business for all other competing forms of telecommunication such as satellites, drones or telecom towers, whose data transmission beams could also not penetrate the thick volcano ash. Protocols would need to be in place to ensure that in the event of a volcano eruption, a balloon of the contemplated type would automatically travel to a safe distance to avoid physical harm, and inform ground control of its position, its actions, and its current operational efficiency. Efforts must be made to minimize disruption to customer service, such as adding additional balloons to the periphery or using alternate technology platforms altogether.

Space Threats

Meteors and space debris can be deadly if they strike a balloon. While meteors are known to combust and dissolve at around 60 km altitude, there is still a risk, however small, of one getting through, or of a piece of man-made debris in space falling to the Earth. Probabilities of collision are based on the frequency of meteor events, and the amount of space that a balloon takes up in the sky. Estimates for a meteor strike of a commercial airplane in transit range between 4 and 10 percent for one incident over the course of 20 years. However small the probability, all efforts should be made to develop a contingency plan. It is contemplated that it will be advantageous to operate two balloons in a given region for each paying customer, thereby ensuring that in the event of failure of any one craft (such as from a meteor or space debris collision event), there will still be a fully functioning craft operating nearby to ensure uninterrupted continuation of service.

Collision/Attack/System Failure

In the event of any other form of collision such as contact with an airplane, helicopter, drone, balloon, bird, other animal, or natural object during ascent or descent, or in the event of an attack (missile or other propelled attack), the balloon craft may be damaged significantly or critically disabled. The balloon control system must be pre-programmed with the ability to evaluate its own condition, transmit such information to ground control to receive instructions, and also be able to make appropriate decisions autonomously, such as through an emergency landing or parachute deployment.

Emergency Landing

The balloon should be able to receive instructions from the command centre to execute a controlled emergency landing. The balloon system should also have the ability to carry out such a decision and action autonomously if needed in the event of a fatal emergency and a loss of communication from the command centre. If the balloon sheath itself is popped, then the system should automatically deploy parachutes to ensure that the payload is recoverable upon returning to ground. Thrusters should be operable at all times to control the craft during descent, and to assist in landing at a desired area. The payload compartment will transmit location at known but secured frequencies, to ensure timely recovery of the contents which will be locked safely inside. Use of land for the landing zone should be negotiated in advance, and appropriate resources should be ready on standby in the event of unscheduled landing as well as for normal maintenance landings, including by not limited to emergency personnel, vehicles, tools, equipment, replacement components and appropriate representatives of the client.

High Altitude Debris

All efforts must be made to fully determine if any threats exist to the balloon and payload within the theatre of operations, the stratosphere. Potential threats such as ice, dust, or ionized particles are considered extremely unlikely, but must nonetheless be carefully examined and evaluated, and potential solutions and fallback scenarios must be developed. In the event of such an unexpected occurrence harming or incapacitating the craft, all of the above precautions and emergency actions should take place.

Balloon Failure

High-altitude superpressure balloons currently have a life expectancy of six months at most, given the severe pressures they undertake and extreme environments they operate in. A balloon of the present type is expected to operate longer because it does not partake in constant altitude adjustments. However, balloons are expected to fail and redundancy plans must be in place to account for such eventualities. A minimum of two balloons should be parked in the target vicinity, to ensure that when one fails or is on the verge of failing, it can be brought down for repair or replacement, while the other balloon remains in the sky to ensure continuation of service. In the event that a balloon fails unexpectedly, emergency landing protocols will be instituted which involve payload detachment from the balloon and parachute deployment for safe landing and recovery of cargo.

Thruster Failure

In the event that one or more thrusters are damaged or become inaccessible or unreliable, it may be decided by the ground crew to return the craft to ground (or to a place where humans or appropriate instruments can physically operate on the craft) for inspection, and possible maintenance. In one possible embodiment, the craft may be automatically programmed to return to Earth in the event of a certain degree of thruster failure (such as a specific count of unreliable thrusters).

Thruster health may be monitored by instruments either on-board the craft, at the ground station, or at some other location, such as (but not limited to) power gauges that measure how much electrical power is consumed by a specific thruster, and/or by a CPU which compares the amount of electricity transmitted to a certain thruster, against changes (or consistency) in position, velocity, acceleration, rotation, vector, or vertical alignment.

Power Transmission Failure

If the balloon should fail to receive power from the ground station for any reason, protocols must be in place so that the balloon can a) transmit the problem to ground station, b) continue operations for a set period of time depending on available battery storage, and c) travel to a designated region of the sky and/or initiate a controlled emergency landing. Depending on the level of activity of other balloons in the region, protocols could be in place for a balloon to receive power from an adjacent transmitting ground station, thereby letting two craft share a communal power source for a temporary period of time.

Failure of Communication

Constant communication between the balloon and the ground station will be maintained to ensure consistent service and peak operational efficiency. In the event of a communication failure but not a power failure, protocols will be in place to decide what steps, if any, to take next. General protocol will be to allow the craft to function with the existing power beam for a set period of time, but if the craft cannot confirm that it is receiving power, it will be required to execute a return to a predetermined receiving point to attempt to re-establish communication. Failing this reconnection, the balloon will be pre-programmed to execute a controlled landing.

Control Failure

If autonomous craft control should be lost and emergency override by ground control fails, the balloon could drift away from target and into foreign territory. In such a case, protocols must be in place to ensure that local partners can take control of the balloon. An important feature for many nations will be the reassurance that they can override the balloon if it happens to drift into their sovereign airspace. A further safety precaution must be in place to ensure override control.

Payload Failure

If a problem should occur with a customer payload requiring hands-on maintenance, two safety features implemented in advance will avoid service interruption. First, in one embodiment of the application of the present invention, two or more copies of the payload shall be deployed in advance to the same altitude, either aboard the same balloon or on a second balloon cruising nearby, to ensure continual operation of the client service in the event that one payload fails. Second, the balloon with the failed payload will be sent for immediate landing, where the payload can be repaired on the ground at the discretion of the client, while the second balloon (and possibly additional balloons) will still be in the sky in the same general vicinity to continue operations, for uninterrupted service. At the discretion of the manufacturer and the client, additional payloads may be placed on stand-by at the launch site, in the event that a replacement is needed rapidly.

Freezing

Appropriate precautions should be taken in advance of any component of the balloon craft suffering either from exposure to low temperatures (−60 Celsius) or from temperature fluctuations, since the craft is exposed to varying conditions during ascent and descent (−60 to +30 Celsius). Throughout the entire balloon craft there are no mechanical moving parts, which greatly improves the durability of the entire system. Further, any sensitive electronic equipment is secured within a temperature-controlled payload container, protecting it from the natural elements. Nonetheless, if any equipment should fail due to temperature, the balloon can follow the protocols above to execute an emergency landing for repair or replacement.

Detachment

In the event that any individual component of the balloon becomes detached and free-falls, emergency parachutes will deploy. If the entire balloon is lost due to damage or unforeseen circumstances, the primary payload and scaffold ladders will separate by explosive means or flight termination units and deploy individual parachutes, for a safe landing on ground. All major components should have tracking equipment for quick and easy recovery, and identification markings instructing any amateur bystanders who to contact.

If a component falls from the craft which is somehow not secured to a parachute, or if a parachute fails, then protocols should be in place to ensure timely recovery of the components, restitution for damages inflicted, and reassurance of the public well-being.

Loss of Craft

In the event of an unscheduled, emergency, or crash landing, there exists the possibility of a total loss of payload. Insurance policies must be determined in advance to determine who will be responsible for paying the cost of replacing the lost equipment and resources. In the event that all backup balloons suffer a fate that leaves the customer completely without service, then such policies must also account for recompense of client losses.

Storage

Spare balloon kits will need to be stored at strategic locations near client service locations, in preparation for replacing any lost balloons in operation. Should an active balloon fail and need to be brought down, emergency crews must be ready on stand-by to deploy the stored balloon with the client payload at a moment's notice. Storage facilities must be safe and secured. In the event of fire, flood, earthquake, other disaster or political unrest, deployment of reserve balloons must not be at risk, and all efforts must be made to ensure that backups are ready for deployment at all times and against all possible adversity.

Detailed Design Considerations

In order to integrate the various components described above, a methodology is now provided in detail. This process will first focus on design of the balloon and thrusters, followed by considerations required for the ground station. Choices for balloon volume, quantity of thrusters, and size of rectenna will all impact one other in an iterative process. The final mass budget is determined through an iterative examination of these components. The top priorities for design involve selecting two critical factors which may be client-specific and could vary from one embodiment to another: (1) the payload mass, and (2) the cruising altitude. Both must be selected for varying criteria, and will be chosen first, below, before moving to a detailed design.

Considerations for Selection of Payload Mass

The total mass required to be carried aboard the balloon (client payload, instruments and sensors, CPU, number of thrusters, etc.) will influence all subsequent design decisions. An initial mass for a prospective client application is selected as 50 kg (110 lbs), a value often used for small satellites. A demonstrative example is the NASA Modular Common Spacecraft Bus (MCSB) used with the LADEE (Lunar Atmosphere and Dust Environment Explorer) spacecraft (Elphic, 2014, Kuroda, 2014). Additional payload for the craft will include sensors, controls, internal wiring, parachute, and flight termination unit. Such equipment for high-altitude balloons can collectively weigh as much as 5 kg for small and short-term high-altitude balloons. We have selected a safety margin of 4 to arrive at an estimate for the mass of 20 kg for these components in this embodiment. The total mandatory mass to be lifted in this embodiment will therefore be 70 kg. This mass might be larger or smaller for any constructor's particular implementation, but the value will be retained in this embodiment for the purposes of demonstrating the steps required to determine all craft parameters, based on an initial mass. That design process is detailed throughout the next section.

Considerations for Selection of a Cruising Altitude

The preferred flight altitude is chosen next. Selection criteria for choosing an optimal cruising altitude includes, but is not limited to: (i) minimizing or eliminating exposure to weather or the ionosphere, (ii) avoiding air traffic, and (iii) minimizing energy expenditure. Additional criteria may come to light which will also affect the choice of cruising altitude including, but not limited to, client preference for a greater or lesser cone of coverage, greater or lesser resolution, or security concerns.

For long duration operation at constant position, the craft should be positioned high above any possible inclement weather to ensure operation among consistent wind conditions. Low-level stratus clouds produce precipitation at or below 2 km (6,500 ft). High-level cirrus clouds produce localized precipitation and can reach heights of 6 km (20,000 ft).

Modern air traffic is commonly located near 36,000 ft (6.8 miles or 11 km) with a historical separation distance between craft of 2,000 ft. An altitude far from this region is preferred for balloon operation. The lowest ceiling of operation is therefore 11 km, given by air traffic.

The upper ceiling of operation is the ionosphere, for which the "D" region begins as low as 50 km. Ionized particles can detrimentally affect on-board sensors and propulsion system, especially ion-based ones, so this region should be avoided. Some balloon experiments have achieved altitudes of 50 km but more common altitudes for balloon flights are notably lower, such as the Raven Aerostar superpressure balloon built for NASA which maintains a constant float altitude of 110,000 feet (20.8 miles or 33.5 km) (Brooke, 2005) and the Super-TIGER at William's Field, Antarctica which cruises at 127,000 ft (24 miles or 38.7 km) (Binns, 2014), well below the ionosphere threshold.

In the range between air traffic and ionosphere, cruise altitude is chosen for minimal wind drag, equal to the drag force ($F_D$):

$$F_D = \tfrac{1}{2} \rho u^2 C_D A \tag{1}$$

Drag coefficient, ($C_D$), depends on many factors including shape (Grass, 1962) and the Reynolds number. Due to its isotropic shape, a sphere would have a uniform drag coefficient independent of wind direction and angle of attack. For spherical balloon shapes, therefore, the primary consideration for drag would be the Reynolds number. At stratospheric flying altitudes, Reynolds numbers for balloons are around $10^4$ to $10^6$. $C_D$ for a sphere is relatively constant at 0.47 in fluid mediums with Reynolds numbers between $10^3$ and $10^5$, with higher Reynolds numbers yielding lower or equivalent drag coefficient values. Thus, for the air mass range of interest, 0.47 can be taken as a conservative maximum constant value for $C_D$ for the proposed balloon system.

By considering air density ($\rho$) and wind speed (u) at various altitudes from meteorological data, the uniform drag coefficient of 0.47 and calculating the corresponding surface area (A) of the superpressure balloon within the range of altitudes, the lowest maximum of average wind force was found to be at a height of 25 km. Therefore this was chosen as the optimal altitude for a geostationary platform in this study to minimize energy expenditure. Though this altitude is most efficient for power consumption, the versatility of the proposed craft will allow for other altitudes as needed to best suit the desired application.

Table 1 presents the atmospheric conditions found at the target altitude.

TABLE 1

Atmospheric parameters (data obtained from (Randel, 1992))

| Parameter | Value | Units |
|---|---|---|
| Altitude chosen above sea level | 25,000 | m |
| Ambient temperature | −51.60 | Degrees Celsius |
| Force of gravity | 9.73 | m/s$^2$ |
| Absolute Pressure | 2,549 | N/m$^2$ |
| Atmospheric density | 0.004008 | kg/m$^3$ |
| Mean zonal winds (at 40° latitude) | 12.36 | m/s |

Ground Coverage Range

Figure 6:
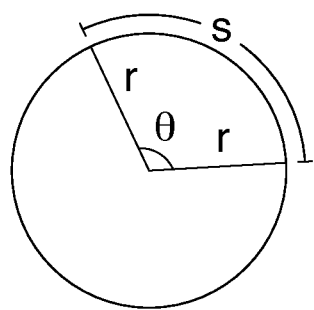
FIG. 6 is a sectional view of the Earth, showcasing ground coverage range (s) as a function of angle (theta) and Earth radius

The span of ground coverage for the high-altitude platform is dependent on the altitude of the craft and the radius of the Earth, as seen in the following formula:

$$s = r\theta \tag{2}$$

where s is the arc length across the Earth (representing the diameter of the cone of coverage), r is the radius of the Earth, and θ is the degree (in radians) between the two ends of s, as seen in FIG. 6, which shows a diameter (s) of the cone of coverage and is found with the angle between the diameter ends (½ θ) and Earth radius (r).

Figure 7:
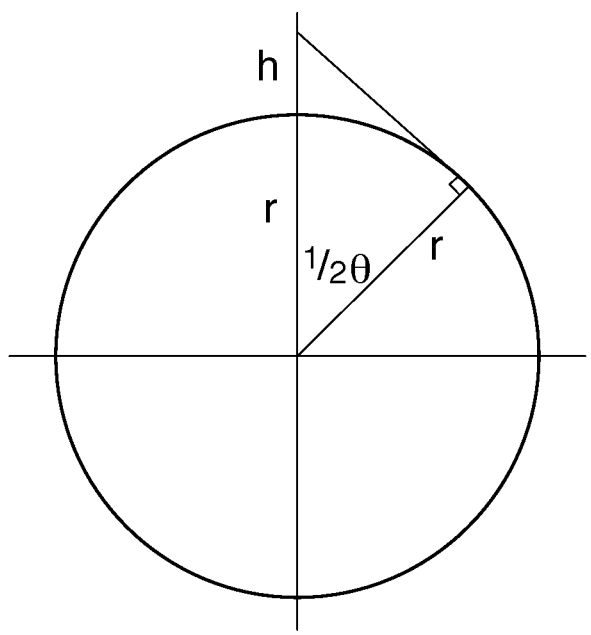
FIG. 7 is a sectional view of the Earth, using craft height and Earth radius to solve for the angle (theta)
Figure 8:
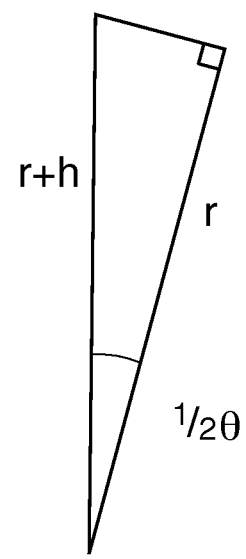
FIG. 8 is an extrapolation of FIG. 7, without the Earth

In FIGS. 7 and 8, the circle represents Earth. From FIG. 7, a line extending from the Earth centre (vertex of where both r lines meet) equidistant apart of each r, and up to the height of the craft, will comprise the sum of the radius and the craft altitude, "r+h". This line is represented in FIG. 8. The line which is tangent to the circle from the end of the angled r to the top of "r+h" is at a right angle to the angled r.

The value of half of θ is found with the following calculation:

$$\cos(1/2\,\theta) = \frac{R_E}{R_E + \text{Altitude}} \quad (3)$$

From the target height of 25 km, based on an assumed Earth radius of 6371 km to deliver an angle (θ) of 0.176889613 radians, the maximum coverage radius would be 565 km (from diameter of 1,127 km), providing a cone of coverage of 997,493 km² (just under 1 million square kilometers) for observation and transmission services. A series of balloons placed at relatively uniform distances apart (approximately 1100 km apart each) could collectively provide uninterrupted telecommunication connection across entire nations or even continents. A detailed link budget for each craft would depend on the various electronic components selected and power demand.

Design of Balloon Volume and Mass

The target altitude dictates the volume necessary for the superpressure balloon, thus volume is the first feature evaluated in determining the total balloon mass. Balloon lift is achieved when the buoyancy force of an object exceeds the gravitational force on that object. A balloon reaches cruising altitude when the forces of buoyancy and gravity equate, such that:

$$\rho_{air} \cdot V_{object} = m_{total} \quad (4)$$

Total mass can be expanded to distinguish between payload mass ($m_{payload}$), balloon skin mass ($m_{balloon}$) and mass of the lifting gas ($m_{gas}$), chosen in this embodiment to be helium. The equation is then further reduced to:

$$\rho_{air} \cdot V_{object} = m_{payload} + m_{balloon} + \rho_{gas} V_{gas} \quad (5)$$

As the balloon sheath is so thin compared to its other dimensions, the volume of the contained gas can be taken as virtually equivalent to the atmospheric displacement by the outer volume of the balloon:

$$V_{object} = V_{gas} = \frac{m_{payload} + m_{balloon}}{\rho_{air} - \rho_{gas}} \quad (6)$$

Density of the lifting gas ($\rho_{gas}$) is found by assuming ideal gas conditions with pressure and temperature at cruising altitude:

$$\rho_{He} = \frac{P_{ext} \cdot M_{He}}{RT} \quad (7)$$

Inserting equation (7) into equation (6) produces an initial volume and thus radius and surface area of the balloon, as well as the mass of helium within. Balloon skin mass can be determined with the known thickness and specific mass. For a balloon skin made of LLDPE (Grass, 1962) the specific mass is 0.94 g/cm³. With surface area, the total drag force (Equation 1, above) can be determined. A drag coefficient ($C_D$) of 0.47 is selected, based on an ideal sphere in air.

Design of Thrusters

For a craft to maintain position in the face of high winds, the force from the thrusters will be set equal to the mean zonal wind forces experienced at 25 km altitude, and for this embodiment at 40 degrees latitude (Randel, 1992). The power needed for the thrusters can be calculated based on the known efficiency of a thruster unit. The thruster from Masuyama et. al was capable of expending 13 W to provide 0.335 N of thrust (Masuyama, 2013) (see Masuyama's FIG. 9-b), which results in a thrust/power ratio of 25.7 N/kW.

Knowing the total power required and the power efficiency per unit thruster, the number of thrusters required can be calculated. With a thrust capability of 0.335 N per EHD thruster unit and a unit mass of 0.24 kg (Masuyama, 2013), the thrust/mass ratio is found to be 1.396 N/kg. The number of thrusters and their total mass can then be calculated. The lattice to support the thrusters will be presumed to equal 10% of the thruster mass, but choice of materials will determine the precise mass.

Design of a Power Receiver

Brown et. al. (Brown, 1987) demonstrated a lightweight, thin film rectifying antenna ("rectenna") which could harness 4 kW of power per 1 kg with 80% efficiency. Working backward from the amount of power needed to operate the thrusters (and the client payload) the minimum necessary size of rectenna can be calculated. An appropriate margin should be assigned to account for various losses at edges and in lines. In this embodiment of the present invention, the rectenna mass is found to be 92 kg.

Craft Design Iteration

The design process for the overall craft now becomes significantly iterative in a positive feedback loop. The increased mass from the addition of thrusters, scaffolding, and rectenna will increase the amount of lift gas required and volume of the balloon, in order to rise to the same altitude. More volume means more surface area, which increases drag, requiring more thrusters to compensate. The added mass will require a balloon with more lift gas and thus of larger volume and surface area, and so forth, making for a significantly large craft based on only a small addition of payload mass. Final parameters are presented below for the present design.

Mass Budget and Craft Parameters

Total thrust and various other parameters can now be determined, along with the mass for all components. Craft parameters are shown in Table 2. The masses for all components are shown in Table 3.

TABLE 2

Craft Parameters

| Category | Units | Known Craft | Ideal Craft |
| --- | --- | --- | --- |
| Balloon diameter | m | 81.6 | 39.8 |
| Balloon surface area | m² | 5,233 | 1,245 |
| Balloon volume | m³ | 284,700 | 33,060 |
| Drag force | N | 7,524 | 1,791 |
| Rectenna area | m² | 292 | 69 |
| Thruster units | | 22,461 | 5,347 |
| Thruster power use | kW | 292 | 70 |

Proposed designs for center column ("Known Craft"): a balloon craft as described in this paper with known EHD thrust-mass ratio based on (Masuyama, 2013), compared against right column ("Ideal Craft"): an ideal balloon craft with thrusters of superior thrust-mass ratio, conceptually based on (Koziell, 2011).

TABLE 3

Mass Budget and Comparison

| Payload Item | Mass with known EHD efficiency (kg) | Mass with anticipated EHD efficiency (kg) |
|---|---|---|
| Client payload | 50 | 50 |
| Internal systems | 20 | 20 |
| Balloon skin | 3,000 | 714 |
| Balloon support | 300 | 72 |
| Thrusters | 5,391 | 129 |
| Scaffolding | 539 | 13 |
| Rectenna | 92 | 22 |
| Helium | 1,940 | 171 |
| TOTAL | 11,332 | 1,191 |

Proposed designs for (left) a balloon craft as described in this embodiment with EHD thrust-mass ratio based on (Masuyama, 2013), compared against (right) an ideal balloon craft with thrusters of superior thrust-mass ratio, conceptually based on Koziell et. al. (Koziell, 2011).

Beyond this embodiment, a reduced craft size employing different embodiments is physically possible by reducing the mass of specific components. For example, one possible embodiment would utilize an EHD thruster with order-of-magnitude improvement in thrust-mass ratio. Such a design change would allow for far less thrusters aboard the craft, enabling significant overall mass reduction by following the preceding design process. The right column in Table 3 demonstrates this case, with a revised craft mass of only 1,191 kg. Such improvement is possible, given that the MIT thruster (Masuyama, 2013) used in this evaluation was not optimized for maximum thrust/mass efficiency and could not generate enough thrust to lift its own weight. Other researchers, however, have demonstrated that such a craft can support its own weight (Koziell, 2011), thereby demonstrating capability of achieving the mass budget in the right-hand column of Table 3.

Design of Ground Station Parameters

Transmitter area and diameter are found by solving or selecting all the variables in the equation for beam efficiency ($\eta$), the ratio of power received ($P_r$) to power transmitted ($P_t$). The transmitting antenna is assumed to have uniform amplitude and phase, and to be correctly aligned with the receiving antennae (Shinohara, 2014). Real situations may vary, requiring more detailed calculations. An examination of the required design considerations for an appropriate ground system follows. All of the parameters required, along with final values taken, to design the ground station can be found in Table 4.

TABLE 4

Power Transmission parameters

| Item | Description | Value |
|---|---|---|
| $A_t$ | total radiated power from transmitter | 44,400 m² |
| $P_r$ | power needed at receiving antenna | 292 kW |
| $n_1$ | rectenna efficiency | 80% (Brown, 1992) |
| $\eta$ | beam efficiency | 75% |
| | other losses neglected for simplification | |
| $P_t$ | power from transmitting antenna | 487 kW (minimum) |
| f | transmission frequency | 2.45 GHz |
| $\lambda$ | transmission wavelength | 0.12 m |
| D | separation between the apertures (balloon altitude) | 25,000 m |
| $\tau$ | beam efficiency coefficient | >2 (Shinohara, 2014) |
| $P_d$ | power density at center of receiving location | 2,300 W/m² |

Design of Beam and Transmission Efficiency

An important distinction must be made in discussing the efficiency of the power transmission system. Beam efficiency used in determining the transmitter size refers to the ratio of energy reaching the receiver compared to how much energy departed from the transmitter, and represents the angular confinement of the radiation pattern. This value is only a small subset of the total system losses comprising "transmission efficiency" which include atmospheric, system, heat, and other losses including beam efficiency. Both types need to be considered in a complete design.

Beam Efficiency

Beam efficiency for radio and microwaves in the near-field is found using the following experimentally-derived equation (Brown, 1992, Shinohara, 2014):

$$\eta = \frac{P_r}{P_t} = 1 - \exp(-\tau^2) \qquad (8)$$

where $\tau$ is a unitless placeholder described in detail shortly.

Design of Transmitter Size

Beam efficiency through the air can in theory achieve 100% (excluding atmospheric losses) given a large enough transmitter and receiver with a $\tau$ value greater than 2. However, considering the transmission distance involved, the frequencies selected, and the limited area available for a receiving antenna on the balloon, the only remaining method to reduce the size of the transmitting antenna (and thus the burden of construction costs) is by reducing the last remaining factor: the beam efficiency. By relaxing the standard chosen for beam efficiency, some of the beam can be allowed to escape beyond the perimeter of the balloon.

A beam which diverges may actually offer an additional advantage in that it will provide a wider range in which the craft can jostle before beam steering requires adjustment. Thus relaxing the precision needed for power aiming will ultimately also ensure greater operational efficiency. Close attention, however, should be paid to the potential consequences of escaped energy which could reach objects such as spacecraft above the target altitude.

Beam efficiency is therefore chosen for the purposes of this embodiment to minimize the final transmitter size. A reasonable value was taken as 75%, which means that 25% of the beam will circumvent the target receiver. This value does not necessarily constitute a more efficient system design, but will nonetheless be used in this embodiment to determine the size of the transmitter (area and diameter).

TABLE 5

Wireless Power Loss Estimates (based on (McSpadden, 2002))

| Loss Source | Efficiency | Comment |
|---|---|---|
| On Ground | | |
| DC-microwave | 87.5% | Magnetrons, klystrons, etc. (McSpadden, 2002) |
| Magnetron | 81.7% | Overall efficiency (McSpadden, 2002) |
| Transmitting antenna | 55-73.3% | Phased arrays (Ren, 2006), etc. |
| Through the Air | | |
| Beam efficiency | 75% | Selected to reduce transmitter size |
| Cosine (angular) | TBD | System optimization required |
| Atmospheric | Negligible | Very low for 1-10 GHz (ITU, 2009) |
| Weather | 0-20% loss | Depend on rain severity (Thiagarajah, 2013) |

TABLE 5-continued

Wireless Power Loss Estimates (based on (McSpadden, 2002))

| Loss Source | Efficiency | Comment |
|---|---|---|
| On the Craft | | |
| Rectenna | 80% | Established technology (Brown, 1984) |
| PMAD | TBD | System optimization required |
| Step-up voltage conversion | 93% | Established technology (Liang, 2013) |
| Thruster efficiency | 25.7 N/kW | Established technology (Masuyama, 2013) |
| TOTAL LOSSES | ~55% | Existing designs (McSpadden, 2002) |

Design of Total Transmission Efficiency

The factors determining total end-to-end system efficiency are described in Table 5. Atmospheric losses are minimized when operating in the frequency range of 1 to 10 GHz. Attenuation is less than 0.01 dB per km for oxygen and less than 0.001 dB per km for water, but rises substantially above that frequency range. Hence, numerous industries rely on this band of low-GHz frequencies for many Earth-to-Space and Space-to-Earth applications including radio astronomy and satellite communications.

Propagation losses due to inclement weather such as strong rain ("rain fade") have been well documented elsewhere. Under certain conditions, rain can generate interference of 0.2676 dB per kilometer (Thiagarajah, 2013).

Additional loss factors include AC-to-microwave conversion losses, any cosine losses from energy not perpendicularly incident on the rectenna array, and power management and distribution (PMAD) losses. Each of these factors would require an increase to the transmitter size in order to deliver the same power needed, and will require specific design work by the constructor to optimizing their system.

As an example estimate of total losses, others have proposed a DC-to-DC efficiency of 45% (McSpadden, 2002) for microwave beams used in space-based solar power (SBSP), the continuous transmission of power from geosynchronous orbit to Earth. Such a transmission system with vastly increased transmission distances would experience losses in excess of the concept proposed here, but the comparison nonetheless offers a valuable baseline reference of what total system performance might be.

Power Frequency Selection

Operation of the system hinges on selecting a desirable frequency for power transmission. Factors which can contribute to frequency selection include, but are not limited to nor restricted to: transmission efficiency; atmospheric attenuation; power density; beam width; reception efficiency; total end-to-end DC-to-DC efficiency; complexity; cost; ease of design, construction, production, transportation, assembly, instalment, deployment; operations, maintenance, removal, recovery, disposal, safety, public opinion, and regulation. Frequencies in any manageable range can be employed which include, but are not limited to, the visible, UV, IR, near-IR, medium-IR, far-IR, radio, and microwave ranges.

Frequencies in the low Gigahertz range (1 through 10 GHz) are particularly well-suited for power transmission, as they experience significantly lower atmospheric absorption and are thus often used for applications such as radio astronomy, Earth-based communication, and space-Earth communication. One viable candidate group of frequencies to be considered in this embodiment include, but are not limited to, the industrial, scientific, and medical (ISM) bands, as governed by the International Telecommunications Union (ITU) for the use of RF energy intended for applications other than communications. Devices such as microwave ovens, cordless phones, military radars and industrial heaters commonly operate within these bands.

Transmitter

Returning to the matter of calculating the transmitter size based on the chosen beam efficiency of 75%, the unitless placeholder $\tau$ from equation 8 is evaluated:

$$\tau = \frac{\sqrt{A_t \cdot A_r}}{\lambda \cdot D} \quad (9)$$

The value $\tau$ is proportional to the surface areas of the transmitting $A_t$ and receiving antennae $A_r$, and inversely proportional to the transmission wavelength $\lambda$ and separation distance D. Employing a receiving area of 269 m² based on the above design with an altitude of 25 km (transmission distance) and a beam wavelength of 0.12236 meters (based on 2.45 GHz), the transmitting antenna is found to be 44,000 m², with 237 m diameter. Additional transmitter sizes for various frequencies in the ISM bands are presented in Table 6. Transmitter using 5.8 GHz offers reduced physical size compared to 2.45 GHz and higher energy per photon. Increasing the frequency beyond these two options could subject the constructor to problems such as regulation issues, higher atmospheric attenuation, and other problems. A transmitter using 24.125 GHz offers advantageous physical size with the trade-off of significantly increased atmosphere attenuation.

TABLE 6

Transmitter Sizes

| Transmission Frequency (GHz) | Antenna Area (m²) | Antenna Diameter (m) |
|---|---|---|
| 2.45 | 44,400 | 237 |
| 5.8 | 5,700 | 85 |
| 24.125 | 330 | 20 |

Transmitter size can be reduced by adjusting other parameters in equation 9, such as by increasing or decreasing the separation distance between craft and ground, thus altering the craft altitude. A different separation distance however could subject the craft to greater wind drag, and in so doing require a larger craft to compensate. Ultimately, a lightweight and easily-transportable transmitting antenna may be the most efficient means of maintaining low cost and complexity, rather than a change in transmitter size.

Power Density Considerations

Beam power density can be found with the following equation:

$$p_d = \frac{A_t \cdot P_t}{\lambda^2 \cdot D^2} \quad (10)$$

The terms from Equation 10 and their values are presented in Table 4. The resultant power density at beam center is 2,300 W/m².

Unfortunately, the ANSI/IEEE standard for maximum permissible human exposure to microwave radiation at 2.45 GHz is currently a mere 81.6 W/m² (8.16 mW/cm²) averaged over six minutes, or 16.3 W/m² (1.63 mW/cm²) averaged over 30 minutes (Lin, 2002). This discrepancy of two orders of magnitude in power density is an ongoing challenge faced by all developers of long-distance wireless power transmission. The matter will require ongoing collaboration with policy makers and regulatory agencies to achieve progress. Technological options to avoid transmission through humans, animals or objects, was presented above.

Various models exist for distributing power across the transmitting antenna including uniform, Gaussian, Chebyshev, and Taylor distributions. All options require specific information about the transmitting system, such as total number of antenna elements, and the ratio between the power at the center and at the edge of the transmitting antenna. Further details are provided by Shinohara (Shinohara, 2014).

Transmission Distance Limit

The transmitter may in some cases need to be placed far from the balloon craft, or the balloon may be required to travel far to perform tasks. The limit of elevation for a phased array antenna is 60 degrees down from zenith. A craft positioned 43 km away from the transmitter (ground distance) could therefore still effectively receive power at its altitude of 25 km, albeit requiring a greater amount of power to accommodate the increased distance from the transmitter.

Greater transmission distance can be achieved by tilting the array toward the target, parallel to the ground to provide wireless power to the craft at 565 km, the same distance as the radius of coverage. Tilting can be performed by designing a rig to rotate the array, or by creating a permanent scaffold on the ground on which to place the array, among other options. Large phased arrays have been used in this manner of tilting throughout the world for many decades, notably in military applications for RADAR services.

Increasing separation distance from the power source by any distance will inherently increase the propagation path, requiring an iterative approach to determine new energy beam requirements, and subsequently craft size.

Assembly

In this embodiment of the present invention, the balloon skin with the protrusions is to be fabricated and assembled. The scaffold should be assembled, along with thrusters, and joined to each other. The rectenna can be printed or assembled on its own or as part of the balloon skin.

The scaffold can be joined to the balloon in a development facility or at the deployment location. The client payload should be encased and secured in the payload cargo hold.

The various components of the balloon train including flight termination unit, parachute, emergency transponders/beacons, any reflector or parabolic dishes to aid in communication and signal reflection, can be added to the train at a development facility or on location.

Deployment of Craft

When all components are added to the launch train and secured, and are ready for deployment, then the balloon should be filled with the requisite about of helium as per common practice with high-altitude superpressure balloons. The balloon will partially inflate at ground-level pressure and temperature. In some embodiments, a guide balloon may be placed above the primary superpressure balloon to provide lift assistance while the primary balloon inflates and pressurizes. The primary balloon (and any proposed secondary balloons) will be released, and the train will follow the balloon up into the sky.

Control of Craft During Ascent

As the balloon ascends, the scaffolds will align vertically beneath it. When all of the thrusters are facing their appropriate directions, then the thrusters can be activated to help guide the craft as it ascends. Thrusters can be activated in uniform to achieve flight in a desired direction, or in countering directions (Left-most thrusters firing forward, while right-most thrusters fire in reverse) to generate a rotation. Then all thrusters can fire in the same direction to achieve forward (or reverse) translation. This control mechanism can be used to help steer the craft and avoid objects and obstacles while the craft rises to the target altitude.

Operation of Craft at Target Altitude

When the craft reaches target altitude, it can be pre-programmed to maintain stable geostationary position by registering its position based on sensors and GPS technology, and firing various thrusters to adjust position accordingly, to achieve a certain destination, or maintain position relative to a guide beacon at the ground station. Emergency measures were discussed above.

Controlled Landing of the Craft

When a landing is desired, a signal will be sent to the craft from the ground station. The antenna and transceiver aboard the craft will receive the message and transfer it to the CPU. Alternatively, the following will take place in the event that the craft has automatically elected to land due to an emergency situation. In both cases, thrusters will automatically be engaged to rotate the craft and guide it in the appropriate direction, while the balloon lowers itself. Means of balloon lowering can include, but are not limited to, expelling excess gas, either to the environment or into a storage chamber, inner balloon, or gas canister, among other options. In emergency situations, the superpressure balloon can be popped and the parachutes deployed to allow the craft to return to Earth quickly. In either case, the thrusters will provide lateral steering while the craft descends, in order to help guide the craft to the desired landing point.

The craft can be brought to a complete landing on ground, or can be lowered to a near-landing (a certain distance above the Earth), and retrieved by some means of capturing including, but not limited to: mechanical, magnetic, or other form of harnessing the craft, tethered and moored at a specific height, if needed. At this point, whether the craft is grounded or stationary at a set altitude, it can be serviced to enact repair, replacement or upgrade to any of the craft components, the entire craft itself, or the client payload. At this time the craft can be placed in storage or, upon inspection including all appropriate safety and regulatory matters, the craft can be prepared for launch again.

Modification and Variations

Whereas a few specific embodiments of the invention are herein shown and described, it will be evident that variation and modification is possible. Accordingly, the invention should be understood to be limited only by the appended claims, purposively construed.

REFERENCES

Binns, W. R. The super-tiger instrument: Measurement of elemental abundances of ultra-heavy galactic cosmic rays, The Astrophysical Journal 788 (2014) 18.

Brooke, Luke. "High altitude LTA platforms: capabilities and possibilities." *AIAA 5th Aviation, Technology, Integration, and Operations Conference (ATIO)*. Arlington, Va.: AIAA, 2005.

Brown, W. C. Performance characteristics of the thin-film, etched-circuit rectenna, IEEE, 1984, pp. 365-367. doi: 10.1109/MWSYM.1984.1131793.

Brown, W. C. Rectenna technology program: Ultra light 2.45 GHz rectenna 20 GHz rectenna, Tech. Rep. NASA STI/Recon Technical Report N (mar 1987).

Brown, W. C. & Eves, E. E. Beamed microwave power transmission and its application to space, IEEE Transactions on Microwave Theory and Techniques 40 (6) (1992) 1239-1250. doi:10.1109/22.141357.

Brown, W. C. The history of wireless power transmission, Solar Energy 56 (1996) 3-21. doi:10.1016/0038-092X (95)00080-B.

DoD, U. S. "Global positioning system standard positioning service performance standard." *Assistant secretary of Defense for command, control, communications, and intelligence,* $4^{th}$ ed. (2008).

Elphic, R., Delory, G., Hine, B. P., Mahafiy, P., Horanyi, M., Colaprete, A., Benna, M. Noble, S. et al., The lunar atmosphere and dust environment explorer mission, Space Science Reviews 185 (1-4) (2014) 3-25.

Gilmore, C. K. & Barrett, S. R. Electrohydro-dynamic thrust density using positive corona-induced ionic winds for in-atmosphere propulsion, in: Proc. R. Soc. A, Vol. 471, The Royal Society, 2015, p. 20140912.

Grass, L. A. Superpressure balloon for constant level flight, Tech. rep., Air Force Cambridge Research Laboratories, Office of Aerospace Research, United States Air Force, L. G. Hanscom Field, Mass. 1962.

ITU Study Group 3. Propagation data and prediction methods required for the design of earth-space telecommunication systems, P Series, Tech. rep. (2009).

Koziell, L., Zhao, L., Liaw, J., & Adamiak, K. Experimental studies of EHD lifters, in: Proc. ESA Annual Meeting on Electrostatics 2011.

Kuroda, V. M., Allard, M. R., Lewis, B., Lindsay, M. Comm for small sats: The lunar atmosphere and dust environment explorer (LADEE) communications subsystem, 2014.

Liang, Tsorng-Juu, et al. "Novel isolated high-step-up DC-DC converter with voltage lift." *IEEE Transactions on Industrial Electronics* 60.4 (2013): 1483-1491.

Lin, J. C. Space solar-power stations, wireless power transmissions, and biological implications, Microwave Magazine, IEEE 3 (1) (2002) 36-42.

Mankins, J. C. The Case for Space Solar Power, Virginia Edition Publishing, 2014.

Massa, A., Oliveri, G., Viani, F. & Rocca, P. Array designs for long-distance wireless power transmission: State-of-the-art and innovative solutions, Proceedings of the IEEE 101 (6) (2013) 1464-1481. doi:10.1109/JPROC.2013.2245491.

Masuyama, K., & Barrett, S. R. H. On the performance of electrohydrodynamic propulsion, Proc. R. Soc. A 469 (2154). doi:10.1098/rspa.2012.0623.

McSpadden, J. O. & Mankins, J. C. Space solar power programs and microwave wireless power transmission technology, IEEE Microwave Magazine 3 (4) (2002) 46-57. doi:10.1109/MMW.2002.1145675.

Moreau, E., Benard, N., Lan-Sun-Luk, J. D. & Chabriat, J.-P. Electrohydro-dynamic force produced by a wire-to-cylinder dc corona discharge in air at atmospheric pressure, Journal of Physics D: Applied Physics 46 (47) (2013) 475204.

Randel, W. J. Global atmospheric circulation statistics, 1000-1 mb, Tech. rep., National Center for Atmospheric Research, Boulder, Colo. National Aeronautics and Space Administration, Washington, D.C. National Science Foundation (February 1992).

Ren, Y. J. & Chang, K. New 5.8-ghz circularly polarized retrodirective rectenna arrays for wireless power transmission, Microwave Theory and Techniques, IEEE Transactions on 54 (7) (2006) 2970-2976.

Shibata, H., Watanabe, Y., Yano, R. & Suzuki, K. Numerical study on fundamental characteristics of electro-hydrodynamic thruster for mobility in planetary atmosphere, in: Transactions of the Japan society for aeronautical and space sciences, aerospace technology, Vol. 12, 2014, pp. 5-9.

Shinohara, Naoki. *Wireless power transfer via radio waves.* John Wiley & Sons, 2014.

Thiagarajah, S. P. The effect of rain attenuation on s-band terrestrial links, in: 2013 IEEE Symposium on Wireless Technology & Applications (ISWTA), IEEE, 2013, pp. 192-197. doi:10.1109/ISWTA.2013.6688768.

Wathen, R. L. Genesis of a generator—The early history of the magnetron, Journal of the Franklin Institute 255 (1953) 271-287. doi:10.1016/0016-0032(53)90388-3.

The invention claimed is:

1. An apparatus comprising:
  a payload;
  a superpressure balloon adapted to suspend the payload at a predetermined altitude;
  electrically-powered thrusters operatively coupled to the balloon and adapted to provide a force suitable to counter winds associated with the predetermined altitude, wherein the thrusters are electrohydrodynamic thrusters;
  a rectenna suspended by the balloon and adapted to produce electricity to power the thrusters and the payload; and
  a controller associated with the payload and adapted to control the thrusters to maintain the apparatus in geosynchronous position above the earth.

2. A system comprising the apparatus of claim 1 and a ground-based microwave generator and antenna array adapted to direct a microwave signal beam to the rectenna.

3. Use of the system of claim 1 to support a payload at an altitude of about 25 km.

4. The apparatus according to claim 1, wherein each thruster is capable of traversing in both forward and reverse direction.

5. A system comprising:
  a superpressure balloon;
  a payload suspended, in use, by the balloon;
  electrically-powered thrusters operatively coupled to and suspended by the balloon, wherein the thrusters are electrohydrodynamic thrusters;
  a rectenna suspended by the balloon, and adapted to convert wireless wave energy into electricity;
  a power means for directing wave energy to the rectenna, wherein the power means, thrusters and rectenna are adapted such that, in use, the thrusters provide sufficient force to maintain the apparatus in geosynchronous position above the earth.

6. The system according to claim 5, wherein the power means s a ground-based microwave generator and an antenna array adapted to direct a microwave signal beam to the rectenna.

7. Use of the system of any one of dams 5 to support a payload at an altitude of about 25 km.

* * * * *

UNITED STATES PATENT AND TRADEMARK OFFICE
CERTIFICATE OF CORRECTION

PATENT NO. : 10,404,353 B2
APPLICATION NO. : 15/766953
DATED : September 3, 2019
INVENTOR(S) : Erinn Van Wynsberghe Page 1 of 1

It is certified that error appears in the above-identified patent and that said Letters Patent is hereby corrected as shown below:

In the Claims

Column 30, Claim 6, Line 59, delete "means s a" and insert -- means is a --.

Column 30, Claim 7, Line 62, delete "dams" and insert -- claims --.

Signed and Sealed this
Eighth Day of October, 2019

Andrei Iancu
*Director of the United States Patent and Trademark Office*